United States Patent
Evans

(10) Patent No.: US 8,274,188 B2
(45) Date of Patent: Sep. 25, 2012

(54) MAGNETIC-ASSISTED LINEAR BEARING

(75) Inventor: Simon Evans, Derbyshire (GB)

(73) Assignee: Ricon Corp., Panorama City, CA (US)

( * ) Notice: Subject to any disclaimer, the term of this patent is extended or adjusted under 35 U.S.C. 154(b) by 359 days.

(21) Appl. No.: 12/759,860

(22) Filed: Apr. 14, 2010

(65) Prior Publication Data
US 2011/0254396 A1    Oct. 20, 2011

(51) Int. Cl.
*H02K 7/09* (2006.01)
*E05D 13/00* (2006.01)
*E05D 15/16* (2006.01)
*E05D 15/06* (2006.01)
*F16C 17/00* (2006.01)
*F16C 21/00* (2006.01)
*F16C 29/00* (2006.01)

(52) U.S. Cl. ............. 310/90.5; 49/360; 49/409; 49/410; 384/8; 384/26; 384/42

(58) Field of Classification Search ............. 310/90.5; 49/409, 410, 360; 384/26, 42, 8; H02K 7/09; E05D 15/16, 13/00, 15/06; F16C 29/00, F16C 17/00, 21/00
See application file for complete search history.

(56) References Cited

U.S. PATENT DOCUMENTS

| | | | | |
|---|---|---|---|---|
| 2,602,708 A | * | 7/1952 | Wheildon, Jr. | 384/42 |
| 3,537,762 A | * | 11/1970 | Lodige | 384/42 |
| 4,090,265 A | * | 5/1978 | Baus | 4/607 |
| 4,473,259 A | | 9/1984 | Goldowsky | |
| 4,698,876 A | | 10/1987 | Karita | |
| 5,501,526 A | * | 3/1996 | Asai et al. | 384/13 |
| 5,609,091 A | * | 3/1997 | Stoll | 92/110 |
| 6,315,451 B1 | * | 11/2001 | Michioka et al. | 384/42 |
| 7,013,605 B2 | | 3/2006 | Zhou et al. | |

FOREIGN PATENT DOCUMENTS

| | | |
|---|---|---|
| EP | 1217160 A2 | 6/2002 |
| EP | 1217161 A2 | 6/2002 |
| JP | 6329375 A | 11/1994 |

* cited by examiner

*Primary Examiner* — Quyen Leung
*Assistant Examiner* — Terrance Kenerly
(74) *Attorney, Agent, or Firm* — The Webb Law Firm

(57) ABSTRACT

A door suspension system comprises a horizontally suspended ferromagnetic shaft; a nonmagnetic bracket comprising a bracket cylinder for enclosing a linear bearing and an attached bracket hanger plate for securing a door panel; a nonmagnetic cylindrical linear bearing sized to slide into the bracket cylinder and over the shaft; at least two spaced bores in the upper surface of the bracket cylinder; at least two spaced bores in the upper surface of the cylindrical linear bearing arranged so as to align with the spaced bores in the bracket cylinder; a cylindrical permanent magnet positioned in at least one of the spaced bores of the bracket cylinder; and a ferromagnetic armature to complete the magnetic circuit through the shaft and the magnet or magnets.

6 Claims, 2 Drawing Sheets

MAGNETIC-ASSISTED LINEAR BEARING

BACKGROUND OF THE INVENTION

1. Field of the Invention

This invention relates to linear bearings useful for enclosing a shaft or rod from which a sliding door is hung, for example, a door on a mass transit vehicle.

2. Description of Related Art

Current linear bearings used on door systems for rail vehicles have about 75N drag associated with them that creates friction requiring larger motors to move the doors to the open and closed positions. Typically, these linear bearings have many moving parts, for example, ball bearings that assist in translating the door along a rod or shaft mounted to the vehicle. Grease and other lubricants are used to keep these linear bearings running smoothly, although contamination is a problem causing failure, increased friction, and pitting of the rod or shaft. The linear bearings are generally enclosed in a bracket having a flat attachment plate for attaching the bracket to the vehicle door and a cylindrical housing for mounting the linear bearing. Typical linear bearings are expensive and costly to maintain in outdoor environments where large amounts of dust and other airborne contaminants are present.

The use of magnets to support at least a portion of the weight of structures, such as door hung from a rail, is disclosed for example in U.S. Pat. No. 4,698,876 entitled "Door Apparatus Partially Supported by a Magnetic Mechanism" and U.S. Pat. No. 7,013,605 entitled "Door Suspension Apparatus." Typically, the magnets are not directly associated with the linear bearing that encloses the rail from which the structure is hung.

SUMMARY OF THE INVENTION

Briefly, according to this invention, a door suspension system comprises a horizontally suspended ferromagnetic shaft; a nonmagnetic bracket comprising a bracket cylinder for enclosing a linear bearing, and an attached bracket hanger plate for securing a door panel. A nonmagnetic cylindrical linear bearing is sized to slide into the bracket cylinder and over the shaft. There are at least two spaced bores in the upper surface of the bracket cylinder and at least two spaced bores in the upper surface of the cylindrical linear bearing arranged so as to align with the spaced bores in the bracket cylinder. A cylindrical permanent magnet is positioned in at least one of the spaced bores of the bracket cylinder and a ferromagnetic plug in the other if not holding a permanent magnet. A ferromagnetic armature abuts the exposed ends of the permanent magnets or permanent magnet and plug to complete the magnetic circuit through the shaft and the magnet or magnets.

Briefly, according to another embodiment of this invention, there is provided a door suspension system comprising a horizontally suspended ferromagnetic shaft; a nonmagnetic bracket comprising a bracket cylinder for enclosing a linear bearing and an attached bracket hanger plate for securing a door panel; a nonmagnetic cylindrical linear bearing sized to slide into the bracket cylinder and over the shaft; means to pin the cylindrical linear bearing to the bracket cylinder, at least two spaced bores in the upper surface of the bracket cylinder; at least two spaced bores in the upper surface of the cylindrical linear bearing arranged so as to align with the spaced bores in the bracket cylinder; cylindrical permanent magnets positioned in the spaced bores of the bracket cylinders having opposite poles facing the ferromagnetic shaft; and a ferromagnetic armature extending across the exposed ends of the cylindrical permanent magnets to complete the magnetic circuit through the shaft and magnets.

Preferably, the linear bearing is a self-aligning bearing. Preferably, the distance of cylindrical magnets from the shaft is adjustable by nonmagnetic washer-like shims place on the stop rim. Preferably, the bores in the bracket cylinder are threaded and a cylinder with external threads is arranged to carry the cylindrical magnets within the bore enabling adjustment of the clearance between the magnets and shaft. Preferably, the bores in the bracket cylinder are provided with a rim to prevent the magnets from contacting and clamping to the shaft. Most preferably, the magnets are neodymium iron boron magnets.

BRIEF DESCRIPTION OF THE DRAWINGS

Further features and other objects and advantages will become apparent from the following detailed description made with reference to the drawing in which.

DESCRIPTION OF THE PREFERRED EMBODIMENTS

The present invention has no roller bearings or other moving parts. A low friction sleeve is used in combination with one or more magnets that attract a rod or shaft about which the magnetic-assisted linear bearing encircles. The magnets are attracted to the rod and offset the force downward of the load to produce a significantly reduced load on the linear bearing. Where the load is known, the magnets may be sized and positioned to adjust the magnetic pull on the rod and lesson the friction in the linear bearing. Where the load may change or otherwise be applied in another direction, the magnets may be adjustable via a threaded carrier or by placement of shims. It is possible to reduce the frictional drag from about 74N to 10N and contamination is not nearly as much of a factor, nor is maintenance.

Figure 1:
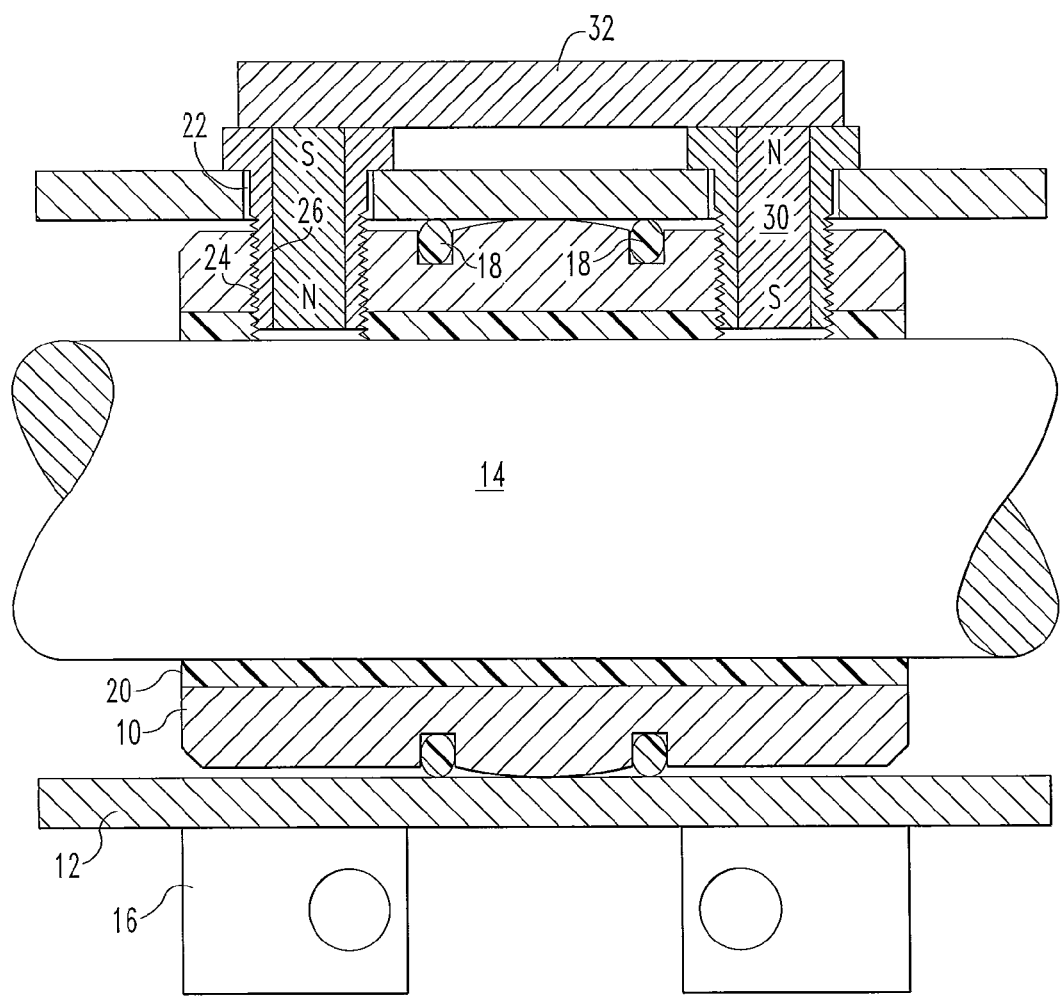
FIG. 1 is a schematic section view through a magnetic-assisted linear bearing, according to one embodiment of this invention.

Referring now to FIG. 1, there is a shown a linear bearing of the self-aligning variety, although this invention would apply to ordinary linear bearings as well. The bearing 10 is positioned within a bracket cylinder or sleeve 12 that encircles a shaft 14 from which may be hung a door or the like from brackets 16 secured to the bracket cylinder or sleeve. The shaft is comprised of magnetic stainless steel, for example. The linear bearing is secured in the sleeve by O-rings 18 that allow for the self-aligning of the bearing within the sleeve. The sleeve and the linear bearing are comprised of a nonmagnetic metal, such as aluminum. Between the sleeve and the shaft is a low friction plastic fluted liner 20. Bearings of this general type, as so far described, are commercially available from Igus Ltd., 51 Casewell Road, Northampton, NN4 7PW, United Kingdom.

Two bores 22 have been bored to pass radially through the upper side of the sleeve. Two internally threaded bores 24 which may be brought to alignment with the bores 22 in the sleeve pass radially through the linear bearing extending to the shaft 14. A cylindrical magnet carrier with external threads 26 passes through bores 22 and engages the internal threads of the bores 24 in the linear bearing 10. Secured within the magnet carriers are high-strength permanent magnets 30. In some embodiments, the second magnet may be replaced by a ferromagnetic plug. The magnets in the two magnet carriers have opposite polarity with reference to the shaft. Positioned to abut the external magnet poles is a ferromagnetic armature 32 that allows for a low permeability path for completion of the magnetic field through both magnets and the shaft. The threads allow for adjusting the clearance between the shaft and the magnets which adjusts the pull on the shaft.

Figure 2:
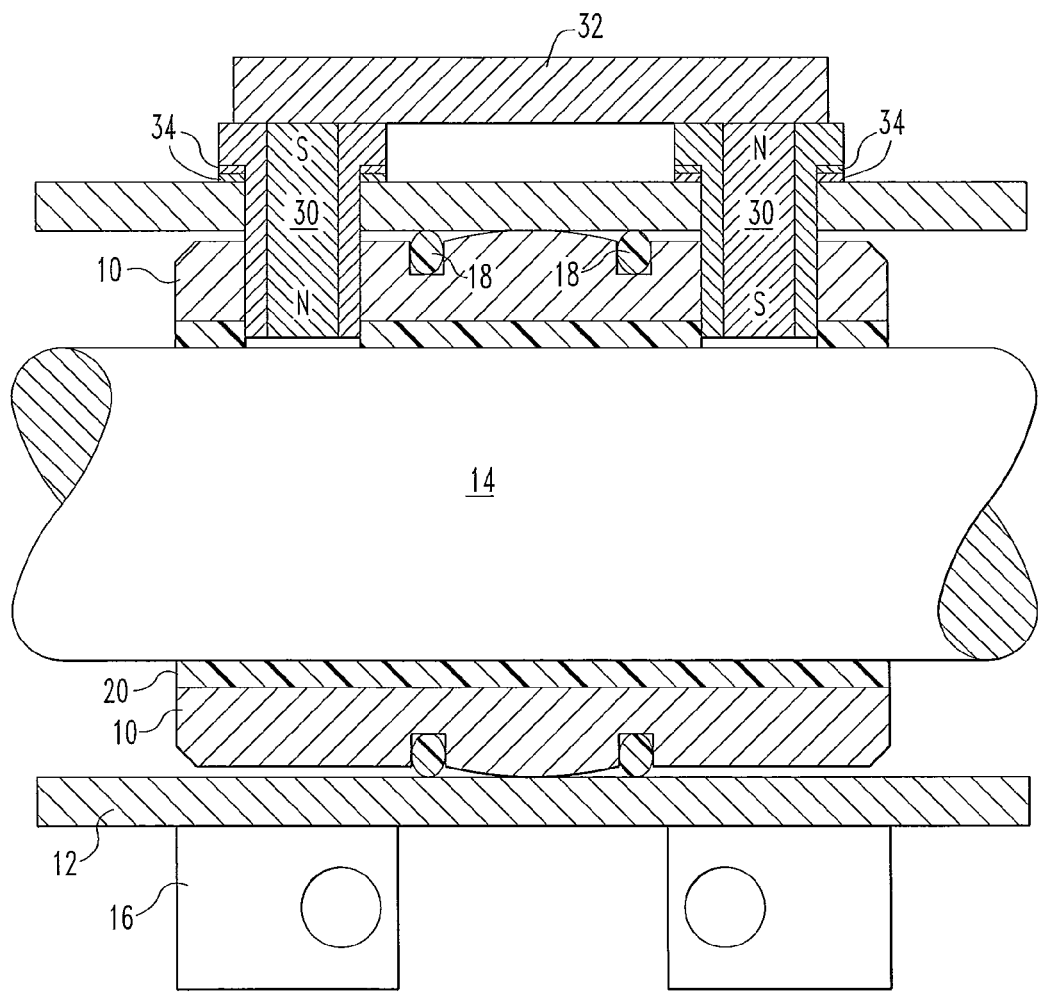
FIG. 2 is a schematic section view through a magnetic-assisted linear bearing, according to another embodiment of this invention.

Referring now to FIG. 2, the embodiment shown is similar to that shown in FIG. 1 except the magnet carriers and the bores in the linear bearing are not threaded. The distance between the magnets and the shaft is adjusted with shims 34 placed between a rim on the magnet carrier and the sleeve.

In a prototype of this invention, the rod or shaft was magnetic induction hardened ground stainless steel with a diameter of 25 mm, which is currently in use in the London Underground door systems. The outside diameter of the linear bearing was 40 mm.

The magnets were neodymium iron boron permanent magnets having a diameter of 20 mm and an axial length of 25 mm.

Having thus defined my invention in the detail and particularity required by the Patent Laws, what is desired protected by Letters Patent is set forth in the following claims.

The invention claimed is:

1. A door suspension system comprising:
a horizontally suspended ferromagnetic shaft;
a nonmagnetic bracket comprising a bracket cylinder for enclosing a linear bearing and an attached bracket hanger plate for securing a door panel;
a nonmagnetic cylindrical linear bearing sized to slide into the bracket cylinder and over the shaft;
at least two spaced bores in the upper surface of the bracket cylinder;
at least two spaced bores in the upper surface of the cylindrical linear bearing arranged so as to align with the spaced bores in the bracket cylinder;
a cylindrical permanent magnet positioned in at least one of the spaced bores of the bracket cylinder; and
a ferromagnetic armature to complete the magnetic circuit through the shaft and the magnet or magnets.

2. A door suspension system comprising:
a horizontally suspended ferromagnetic shaft;
a nonmagnetic bracket comprising a bracket cylinder for enclosing a linear bearing and an attached bracket hanger plate for securing a door panel;
a nonmagnetic cylindrical linear bearing sized to slide into the bracket cylinder and over the shaft;
means to pin the cylindrical linear bearing to the bracket cylinder;
at least two spaced bores in the upper surface of the bracket cylinder;
at least two spaced bores in the upper surface of the cylindrical linear bearing arranged so as to align with the spaced bores in the bracket cylinder;
cylindrical permanent magnets positioned in the spaced bores of the bracket cylinders having opposite poles facing the ferromagnetic shaft; and
a ferromagnetic armature extending across the exposed ends of the cylindrical permanent magnets to complete the magnetic circuit through the shaft and magnets.

3. The door suspension system according to claim 1 or 2, wherein the linear bearing is a self-aligning bearing.

4. The door suspension system according to claim 1 or 2, wherein the distance of cylindrical magnets from the shaft is adjustable by washer-like shims placed on the stop rim.

5. The door suspension system according to claim 1 or 2, wherein the bores in the bracket cylinder are threaded and a tube with external threads is arranged to carry the cylindrical magnets within the bore enabling adjustment of the clearance between the magnets and shaft.

6. The door suspension system according to claim 1 or 2, wherein the magnets are neodymium iron boron magnets.

* * * * *